United States Patent [19]

Podschus

[11] 3,958,341
[45] May 25, 1976

[54] PROCESS FOR THE PRODUCTION OF ACTIVE ALUMINUM OXIDE IN BEAD AND POWDER FORM

[75] Inventor: Ernst Podschus, Leverkusen, Germany

[73] Assignee: Bayer Aktiengesellschaft, Leverkusen, Germany

[22] Filed: Oct. 17, 1973

[21] Appl. No.: 407,096

Related U.S. Application Data

[63] Continuation-in-part of Ser. Nos. 204,736, Dec. 3, 1971, abandoned, and Ser. No. 363,059, May 23, 1973, abandoned.

[30] Foreign Application Priority Data

Dec. 5, 1970 Germany............................ 2059946
June 8, 1972 Germany............................ 2227804

[52] U.S. Cl........................................ 34/12; 34/10; 34/57 E; 423/628
[51] Int. Cl.² ............................................ F26B 7/00
[58] Field of Search ....................... 34/12, 10, 57 E; 432/14; 423/625, 628, 629

[56] References Cited
UNITED STATES PATENTS

| | | | |
|---|---|---|---|
| 2,915,365 | 12/1959 | Saussol ............................... | 423/628 |
| 3,020,646 | 2/1962 | Joseph et al............................ | 34/10 |
| 3,021,195 | 2/1962 | Podschus et al..................... | 65/21 X |
| 3,222,129 | 12/1965 | Osment et al....................... | 423/628 |
| 3,226,191 | 12/1965 | Osment et al....................... | 423/625 |
| 3,623,993 | 11/1971 | Pearson ............................. | 423/625 |
| 3,701,718 | 10/1972 | Papee et al........................ | 423/625 |

FOREIGN PATENTS OR APPLICATIONS

| | | | |
|---|---|---|---|
| 801,462 | 9/1958 | United Kingdom................. | 423/628 |
| 1,081,098 | 8/1957 | United Kingdom................. | 423/628 |

OTHER PUBLICATIONS

Newsome et al., "Alumina Properties," Technical Paper No. 10, 2nd Revision, 1960, pp. 39–45.

*Primary Examiner*—John J. Camby
*Attorney, Agent, or Firm*—Connolly and Hutz

[57] ABSTRACT

Highly active aluminum oxide characterized by a severely disturbed crystalline structure of χ-(chi-)aluminum oxide, a specific surface area of about 260 to 400 m²/g according to BET, a residual water content of 2 to 10 % and a water absorption capacity at 50 % relative atmospheric humidity of more than 15 %, and process of producing same by heating aluminum hydroxide to a temperature of 350° to 800°C with a residence time of from 0.1 to 2 seconds in a zone of high turbulence in a hot gas which enters said zone at a temperature of about 500° to 1200°C at an inflow rate of 30 to 150 m/second. These highly active aluminum oxide may be formed into beads by grinding said aluminum oxide to a specified particle size and forming the aluminum oxide under addition of water.

4 Claims, 1 Drawing Figure

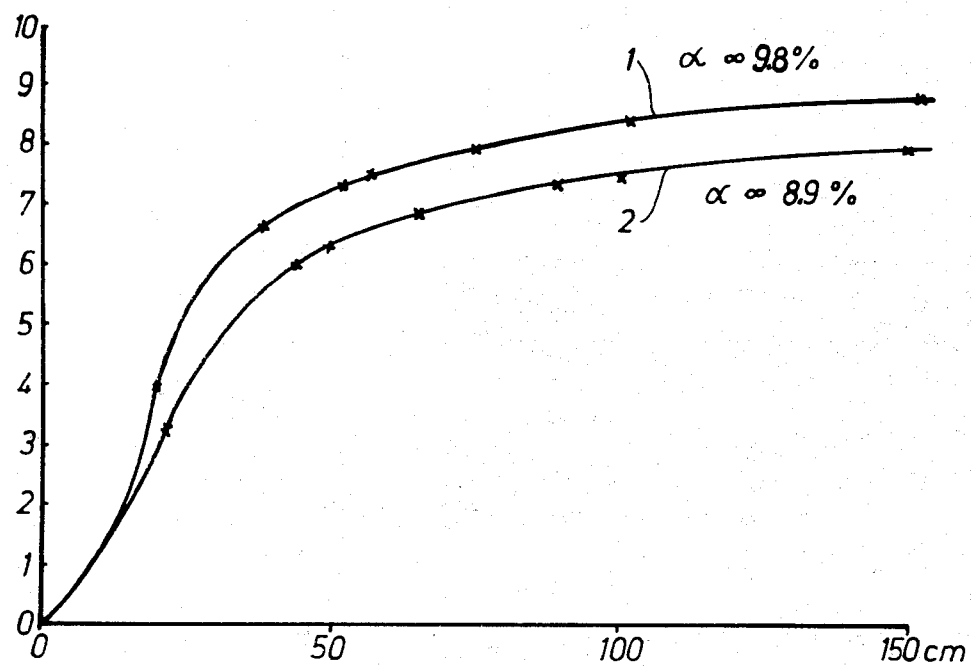

PROCESS FOR THE PRODUCTION OF ACTIVE ALUMINUM OXIDE IN BEAD AND POWDER FORM

CROSS-REFERENCE TO RELATED APPLICATIONS

This application is a continuation-in-part of application Ser. No. 204,736 filed Dec. 3, 1971 and now abandoned and of application Ser. No. 363,059 filed May 23, 1973 and now abandoned.

This invention relates to a process for the production of highly active aluminum oxide in granule or powder form, more particularly in the form of hard, highly abrasion resistant beads.

It is known that aluminum hydroxide from the Bayer alumina process, α-trihydrate which exists essentially in the form of hydrargillite, can be finely ground and, following the addition of binders, converted into bead-form granules in granulating machines. These beads are dried and activated by incomplete dehydration at temperatures of about 300° to 500°C. Instead of shaping finely ground aluminum oxide trihydrate and then activating the granules, it has also been proposed initially to subject the powdered trihydrate to partial dehydration by heating, for example down to a residual water content of from 8 to 14%, subsequently to granulate the active alumina in the presence of water or binders and then to reheat the granules to remove part of the water content until a product with a heating loss of 1 to 12 % by weight is left.

In the second method, therefore, heating has to be carried out twice for partial removal of the water of hydration. The heating process is carried out in rotary furnaces, in tunnel furnaces or in a fluidized bed and, for activating the granules, even in shaft furnaces.

To activate the trihydrate, it has also been proposed to heat the trihydrate rapidly in a hot gas stream at from 800° to 1.000°C in a form of a cyclone burner, resulting in the formation of an active aluminum oxide in the η-form with a residual water content of preferably only 0.35 to 1.75 % by weight (water content herein is always indicated in percent by weight). According to another proposal, the alumina trihydrate particles are passed at high speed through a firing zone at from 1650° to 1930°C and then rapidly cooled. The active aluminum oxide thus prepared is then finely ground until 80% by weight have a grain size of less than 44 $\mu$. The particles are then moistened with water, granulated and reactivated by heating for 2 to 3 hours to about 400°C.

In conventional processes for the production of active aluminium oxide, a mixture of transition phases and boehmite is always formed, the latter making only a limited contribution to the adsorption capacity. The boehmite fraction can amount to as much as 40%. According to the literature (cf. Kirk-Othmer, Encyclopedia of Chem. Technology (1963), Vol. 2, page 49), this boehmite fraction is only avoided by calcining very finely ground trihydrate in a certain way.

Instead of using alumina hydrate from the Bayer process as the starting material, it is also possible to activate amorphous gels, formed by precipitation from aluminium salts in the alkaline range, by partial dehydration. It is possible by this involved process to obtain active aluminium oxide products with a particularly high specific surface from gel-form α-monohydrate.

A process for the production of highly active aluminum oxide in granulate form by partially dehydrating alumina hydrate, grinding the active oxide and then granulating it in the presence of water, followed by reheating, has now been found and is distinguished by the fact that partial dehydration is carried out using unground standard commercial-grade aluminum oxide trihydrate in a turbulent hot-gas stream with a temperature of from 500° to 1200°C, resulting in the formation of a highly active aluminum oxide with the heavily distorted crystalline structure of Chi-$Al_2O_3$, a specific surface area according to BET of greater than 260 $m^2/g$, preferably greater than 300 $m^2/g$, a residual water content of from 2 to 15%, preferably from 3 to 12%, and a water-absorbing capacity of more than 15% at 50% relative humidity, and further by the fact that this highly active $Al_2O_3$ is ground until the screening residue on a 40 $\mu$ screen amounts to less than 20%, after which shaped bodies may be produced in a conventional machine following the addition of water and, optionally, binders, preferably rolled into beads of from 1 to 10 mm in diameter, the shaped bodies stored moist for at least 10 hours and then dried, followed by activation with a dry inert gas at from 200° to 500°C.

Surprisingly, it has been found that shaped bodies of highly active aluminum oxide, more particularly aluminum oxide beads of superior activity, hardness and abrasion resistance, can readily be obtained by treating standard commercial-grade alumina hydrate, hydrargillite, in accordance with the invention. The grain size of such starting material is between about 1 micron and about 300 microns, whereby 60 to 80 % of the particles have diameters of from about 40 up to about 150 microns. It is of particular advantage to heat the alumina hydrate for about 0.1 to 2 seconds, preferably from 0.1 to 1 second, to temperatures of from 350° to 800°C, preferably from 400° to 700°C, in a turbulent hot-gas stream.

The high-speed partial dehydration process can be carried out with particular advantage in an axially symmetrically conical apparatus into which the hot gas is tangentially blown at the narrow end, after which it develops a spiral, high-velocity flow along the wall and, at the wide end of the apparatus, partially flows back axially with reversal of the direction of flow. The aluminum oxide trihydrate in standard commercial-grade unground form is preferably blown in axially at the wide end of the calcining apparatus and is picked up by the return flow. It is heated to the outlet temperature of the gas and largely dehydrated in the high-turbulence zone which is developed between the spiral wall flow and the axial return flow of the hot gas.

One suitable apparatus is described, for example, in U.S. Pat. No. 3,021,195. The process according to the invention differs from conventional high-speed heating processes in that it allows the hot gas stream to be more heavily laden with product, i.e., with more than 150 $g/m^3$ of product, in that the alumina hydrate directly enters the temperature zone and the calcination product leaves the reactor within less than 1 second heated to from 350° to 800°C and is separated in a following cyclone, whereas in the apparatus used in the conventional process the alumina hydrate is first preheated by the hot exhaust gases and then, through a cyclone, enters the fresh hot-gas stream which blows it tangentially into the actual reaction chamber, in the form of a cyclone, at the upper wider end, whilst the calcined product is discharged axially at the lower end of the cyclone in the usual way. In the second before mentioned high-speed dehydration process, some overheating cannot be ruled out.

In the shock-heating process applied in accordance with the invention, the hot combustion gases enter the reaction zone at a temperature of from 500° to 1200°C and a rate of flow of from 30 to about 150 m/second, and leave it with the active aluminum oxide at a temperature of from 350° to 800°C, preferably 400° to 700°C. The grade of turbulence thereby is characterized by the short residence time of less than one second. The highly active aluminum oxide formed has substantially the same particle size distribution as the starting material. According to the X-ray diffractogram, it shows the heavily distorted crystal structure of Chi-aluminum oxide.

Since approximately 60 to 80 % of the particles have diameters of from about 40 $\mu$ up to about 150 $\mu$, the starting material and the active aluminum oxide have a freeflow quality which considerably simplifies dosing, handling and separation.

The conventional high-speed heating process for the finely ground aluminium hydroxide gives an aluminum oxide of $\eta$-structure which has a specific BET surface of only 125 m$^2$/g with a calcination temperature of 500°C, whereas the products obtained by the process according to the invention have a specific surface of greater than 260 m$^2$/g, even at a heating temperature as high as 800°C.

In U.S. Pat. No. 2,915,365 a process for preparing activated alumina from commercial alpha alumina hydrate is disclosed. According to that method a product is obtained which undergoes a transitation to $\eta$(eta-)alumina during heating to 700° to 900°C, whilst starting from the product according to the invention a modified $\gamma$(gamma-) Al$_2$O$_3$ is obtained. Further the present product shows a higher surface area and a higher water adsorption capacity.

Despite of the use of unground, free-flowing aluminum hydroxide, no detectable boehmite fraction (i.e., a boehmite content lower than 5 % by weight) of the kind inevitably encountered in conventional processes (cf. Kirk-Othmer, Encyclopedia of Chem. Technology (1963), Vol. 2, page 49), is formed in the process according to the invention. On the other hand in the conventional heating process, a boehmite-free product can only be obtained if a very finely ground aluminum oxide trihydrate is used as the starting material and this involves considerable disadvantages in regard to handling and increases the cost of the process.

It has also been found that the highly active oxide obtained by shock heating in the manner described can be ground more easily than the starting material. It is also easier to grind up than active aluminum oxide produced by different other heating methods. Grinding is continued until the screening residue on a 40 $\mu$-screen is less than 20%. The product can then readily be formed in known manner in granulating machines, combined with the addition of water of from 40 % to 55 % by weight based on active Al$_2$O$_3$, it can be rolled, for example, in the usual way to form bead-form granules. The shaped bodies show high green strength. They are best stored moist for several hours before actually being dried at around 100°C. Re-Activation can, e.g., be carried out in a shaft furnace with a hot, dry inert gas, for example with air which is heated indirectly through a heat exchanger to from 300° to 450°C. As used herein the term "inert gas" includes any gas or mixture of gases which does not react with Al$_2$O$_3$, normally air.

The shaped bodies produced in accordance with the invention, more particularly beads of active aluminum oxide, are superior to known products in their water absorption and strength.

They can be used in a known manner, for example for drying gases and liquids, for removing hydrogen fluoride from exhaust gases and for the production of catalysts.

For applications in which the high level of activity is undesirable, the active Al$_2$O$_3$ can be converted into less active forms, eventually into $\alpha$-Al$_2$O$_3$ by prolonged calcination at temperatures around 1000°C and higher. In this case, the process according to the invention affords the advantage over the direct forming of $\alpha$-Al$_2$O$_3$ of better formability and green strength by virtue of the greater binding capacity.

The shaped bodies can be produced in the usual machines by pressing, extrusion and granulation. Beads produced on granulating plates or in granulating drums are generally preferred. It should, however, be indicated, that for many purposes it is not necessary to form beads of the active Al$_2$O$_3$-powder. For many uses, for instance in fluidizied bed processes it is even advantageous to work with the active oxide in powder form.

BRIEF DESCRIPTION OF THE DRAWING

The drawing is a graph pertinent to comparisons made in Example 3 hereinafter and shows the breakthrough load in percent by weight on the ordinate and the bed height in centimeters on the abscissa.

The process according to the invention is illustrated by the following Examples:

EXAMPLE 1

Aluminum hydroxide is injected axially into the upper, wider end of a conical reaction chamber of about 15 l capacity by means of an injector operated with 10 to 20 Nm$^3$/h of compressed air.

The aluminum oxide trihydrate used had the following screen analysis data:

| | |
|---|---|
| >0.15 mm | 1.4 % |
| 0.12–0.15 mm | 2.5 % |
| 0.10–0.12 mm | 4.8 % |
| 0.09–0.10 mm | 4.8 % |
| 0.075–0.09 mm | 8.4 % |
| 0.06–0.075 mm | 19.2 % |
| 0.05–0.06 mm | 5.2 % |
| 0.04–0.05 mm | 34.7 % |
| <0.04 mm | 18.5 % |
| (screening loss | 0.5 %) |

A combustion gas corresponding to 120 Nm$^3$ of air is introduced tangentially into the lower end of the reaction chamber at a flow rate of about 70 m/sec. The calcined particles of aluminum hydroxide leave the reactor tangentially at the upper end after a time of stay of less than 1 second and are deposited in a cyclone connected behind the reactor. The combustion gas is produced in a burner connected in front of the reactor and enters the reaction chamber at the temperatures shown in the following table. By suitably varying the rate at which aluminum hydroxide is fed into the reaction chamber from a vibratory conveyor trough, the temperature at which the gas leaves the reaction chamber is adjusted to the values shown in the Table by the amount of heat used up in raising the temperature and splitting off the water of hydration. The properties of the active aluminium oxide obtained are shown in the next columns:

| Experiment No. | Gas temperature | | Properties of aluminium oxide | | |
|---|---|---|---|---|---|
| | Inlet °C | Outlet °C | Specific surface area m²/g | Loss on calcining % | Water absorption at 50% relative humidity % |
| 1 | 830 | 400 | 351 | 10.3 | 15 |
| 2 | 870 | 500 | 388 | 5.9 | 17.8 |
| 3 | 950 | 600 | 365 | 4.4 | 18.1 |
| 4 | 950 | 800 | 347 | 4.1 | 17.0 |
| 5 | 1040 | 1000 | 250 | 1.3 | 12.0 |
| $Al_2O_3$ active powder, commercial product | | | 170 | 8.8 | 7.5 |
| $Al_2O_3$ obtained by heating the trihydrate to 385°C in a quartz pan | | | 230 | 6.9 | 13.5 |

Two commercial products and one preparation which was obtained by heating a thin layer of aluminum hydroxide in a quartz pan are used for comparison.

EXAMPLE 2

Aluminum hydroxide (same screen data as in Example 1) was injected axially from the top through an injector operated with compressed air into a brick-lined conical reaction chamber of about 500 liters capacity into which combustion gas was introduced tangentially from below in a manner analogous to that employed in the smaller apparatus of Example 1. The powder, which was very free flowing, was fed into the apparatus from a silo by means of a multicompartment sluice. The hot combustion gas was produced by burning natural gas in a brick-lined combustion chamber preceding the reaction chamber. Blowers were used for raising the natural gas and air of combustion to the pressure required for over-coming the flow resistance. The calcined active aluminum oxide leaving the reaction chamber tangentially at the top together with the combustion gas was separated from the stream of gas in cyclones behind the reaction chamber and was fed into a stream of delivery air through multicompartment sluices, this air serving at the same time to cool the material. The stream of air delivered the oxide pneumatically into a silo. Combustion of 50 Nm³ of natural gas with about 900 Nm³ of air per hour resulted in an inlet temperature into the reactor of 900°C. The outlet temperature was kept at 500°C by supplying about 250 kg of aluminium hydroxide per hour. After being conveyed pneumatically with atmospheric air which had not been dried, the calcined aluminum oxide was found to have a residual water content, determined as loss of calcination of 6.3%. The specific surface area according to BET was 354 m²/g and the water absorption in air of 50% relative humidity was 16%.

EXAMPLE 3

The dry grinding of 1 liter of product of Example 1 over a period of 17 hours in a porcelain ball mill with the same ball filling for each test produced the following screening residues on a 40 µ screen:

| | |
|---|---|
| Alumina trihydrate, starting material, ground | 41.0% |
| Active $Al_2O_3$, test 2 of Example 1, ground | 8.5% |

Granules with an average grain size of 4 mm were produced from the ground product, test 2, by rolling on a granulating plate with the addition of approximately 50% of water. The granules were stored moist for 24 hours, dried at 100°C and then activated by heating for 1 hour at 350°C in a crucible furnace through which dry air was passed.

Table I shows a few properties by comparison with a good commercial product similarly activated at 350°C which, according to an X-ray diffractogram, consists of $\gamma$-$Al_2O_3$ with a small boehmite component, whilst the granulated product according to the invention originally shows only the interferences of the heavily lattice-distorted Chi-$Al_2O_3$.

TABLE I

| | bead size | crushing strength kg | water absorption static at: | | |
|---|---|---|---|---|---|
| | | | approximately 10% | approximately 50% | approximately 60% |
| | | | relative humidity | | |
| 1) Product according to the invention | approximately 4 mm | 16.3 | 6.9 | 17.1 | 21 |
| 2) Commercial product | approximately 4 mm | 10.4 | 6.4 | 15.8 | 19 |

The average crushing strength values were determined with a Pfizer Hardness Tester.

Both products were also compared with one another in a dynamic test, in this case after heating at 300°C in a dry air stream, and the load at break-through plotted against the bed height. See the drawing. The test conditions were as follows:

| | Product 1 | Product 2 |
|---|---|---|
| Filling in g | 226 | 283 |
| Bed height in cm | 72.5 | 89.5 |
| Tube diameter in mm | 24.1 | 24.1 |
| Throughput Nm³/h | 0.826 | 0.847 |
| Pressure atms. | 1 | 1 |
| Temperature °C | 25 | 25 |
| Rate of flow cm/s | 53.8 | 53.8 |
| Water content g/Nm³ | 4.10 | 4.60 |

Air with the moisture content specified was used as the test gas. The load at break-through of product 1 is distinctly higher than that of product 2.

In the accompanying graph, the break-through load is shown (in % by weight) on the ordinate and the bed height in cm on the abscissa.

EXAMPLE 4

The free-flowing active $Al_2O_3$ of Example 2 was ground for 24 hours in a ball mill. Thereafter, it was no longer free-flowing. The residue on a 40 µ screen amounted to 11%.

The ground active aluminum oxide was rolled into beads with an average diameter of 4 mm in a granulating drum in which approximately 50% of water was sprayed onto it. The beads were stored moist for about 24 hours.

They were then introduced into a shaft furnace through which a stream of dry air flowed upwards at a temperature of 380°C. After the uppermost layer of the shaft-furnace filling had also reached a temperature of 380°C, which took 2 hours, the granules were left at this temperature for another 1.5 hours and then run off into a silo through which dry air at room temperature with a dewpoint of −70°C was passed. After cooling, the granules were divided up into screen fractions. Thereafter, the granules had a heating loss of 3.5%.

Table II shows the hardness and water-absorption values at 10 and 60% relative humidity by comparison with some commercial products which had been activated in a crucible furnace at 380°C while dry gas was passed through (cf. Example 3).

TABLE II

|  | hardness kg | equilibrium loading at approximately 10% relative humidity | approximately 60% relative humidity |
|---|---|---|---|
| Product according to the invention, Example 2 | 15.6 | 8.3 | 23.0 |
| Commercial product A | 11.9 | 6.9 | 20.8 |
| Commercial product B | 9.1 | 6.7 | 20.5 |
| Commercial product C | 11.5 | 5.3 | 17.1 |

What is claimed is:

1. A process for producing highly active aluminum oxide having a heavily distorted crystalline structure of $\chi$ (chi)-$Al_2O_3$, a specific surface area of 260 to 400 $m^2/g$ according to BET, a residual water content of 2 to 10% and a water absorption capacity at 50% relative humidity of more than 15%, said process comprising establishing a vortex of hot gas having an entry end, an outlet end and a central area in which there is a flow of gas toward the entry end of the vortex, said central area being surrounded by an external area in which there is a circular flow of hot gas around said area and toward the outlet end of the vortex, said gas entering said vortex at a temperature of from 500° to 1200°C. at a rate of inflow of 30 to 150 m/sec., introducing aluminum oxide trihydrate into said central area and thereby suspending said aluminum trihydrate in the hot gas and producing a suspension having a temperature of 350° to 800°C., removing the resulting suspension from the vortex at a rate that the residence time thereof in the vortex is from 0.1 to 2 seconds and recovering resulting highly active aluminum oxide from said suspension.

2. The process of claim 1 wherein said residence time is from 0.1 to 1 sec.

3. The process of claim 2 wherein the produced suspension has a temperature of 400° to 700°C.

4. The process of claim 3 wherein said aluminum oxide trihydrate is of unground standard commercial grade.

* * * * *